(12) United States Patent
Michiels et al.

(10) Patent No.: US 10,223,511 B2
(45) Date of Patent: Mar. 5, 2019

(54) WATERMARKING INPUT AND OUTPUT OF A WHITE-BOX IMPLEMENTATION

(71) Applicant: NXP B.V., Eindhoven (NL)

(72) Inventors: Wilhelmus Petrus Adrianus Johannus Michiels, Eindhoven (NL); Stefan Kuipers, Eindhoven (NL)

(73) Assignee: NXP B.V., Eindhoven (NL)

( * ) Notice: Subject to any disclaimer, the term of this patent is extended or adjusted under 35 U.S.C. 154(b) by 381 days.

(21) Appl. No.: 15/084,817

(22) Filed: Mar. 30, 2016

(65) Prior Publication Data

US 2017/0286647 A1    Oct. 5, 2017

(51) Int. Cl.
| | |
|---|---|
| *G06F 21/16* | (2013.01) |
| *G06F 21/10* | (2013.01) |
| *H04L 9/00* | (2006.01) |
| *H04L 9/06* | (2006.01) |

(52) U.S. Cl.
CPC .............. *G06F 21/16* (2013.01); *G06F 21/10* (2013.01); *H04L 9/002* (2013.01); *H04L 9/0618* (2013.01); *H04L 9/0631* (2013.01); *G06F 2221/0733* (2013.01); *G06F 2221/0737* (2013.01); *H04L 2209/16* (2013.01); *H04L 2209/606* (2013.01); *H04L 2209/608* (2013.01)

(58) Field of Classification Search
None
See application file for complete search history.

(56) References Cited

U.S. PATENT DOCUMENTS

| | | | | |
|---|---|---|---|---|
| 7,395,433 | B2 * | 7/2008 | Chow .................... | G06F 21/10 713/168 |
| 8,726,029 | B2 | 5/2014 | Katzenbeisser | |
| 9,275,199 | B2 * | 3/2016 | De Laat .................. | G06F 21/10 |
| 9,455,833 | B2 * | 9/2016 | Michiels ............... | H04L 9/3231 |
| 9,641,337 | B2 * | 5/2017 | Michiels ............... | H04L 9/3242 |
| 2005/0021966 | A1 * | 1/2005 | Chow .................... | G06F 21/10 713/176 |
| 2007/0014394 | A1 | 1/2007 | Harder et al. | |
| 2010/0296649 | A1 * | 11/2010 | Katzenbeisser ......... | G06F 21/10 380/28 |

(Continued)

FOREIGN PATENT DOCUMENTS

WO    2009034504 A2    3/2009

OTHER PUBLICATIONS

Rosenblatt, Bill, "The New Technologies for Pay TV Content Security," GiantSteps Media Technology Strategies, New York, NY 10107 USA, XP002689399, Dec. 5, 2011, 27 pages.

(Continued)

*Primary Examiner* — Michael R Vaughan (57) ABSTRACT

A method of mapping an input message to an output message by a keyed cryptographic encryption operation, wherein the keyed cryptographic encryption operation includes a first round, including: performing a substitution function on a first portion of the input message to produce an output, wherein the substitution function incorporates a portion of a cryptographic key; and performing a watermarking function on the output, wherein the watermarking function produces a watermark output when the first input portion has a specific predetermined value, wherein the watermark output uniquely identifies the keyed cryptographic encryption operation.

28 Claims, 5 Drawing Sheets

(56) References Cited

U.S. PATENT DOCUMENTS

| | | | | |
|---|---|---|---|---|
| 2010/0299515 | A1* | 11/2010 | Michiels | G06F 21/10 |
| | | | | 713/150 |
| 2015/0121073 | A1* | 4/2015 | Wajs | G06F 21/10 |
| | | | | 713/168 |
| 2015/0312039 | A1 | 10/2015 | Michiels et al. | |
| 2015/0365498 | A1* | 12/2015 | Agrawal | H04L 67/08 |
| | | | | 709/203 |
| 2016/0071229 | A1* | 3/2016 | Beaubien | G06T 1/0028 |
| | | | | 382/100 |
| 2017/0116410 | A1* | 4/2017 | Wajs | G06F 21/53 |
| 2017/0237551 | A1* | 8/2017 | Van Foreest | H04L 9/002 |
| | | | | 713/189 |
| 2017/0345119 | A1* | 11/2017 | Asthana | G06T 1/0071 |

OTHER PUBLICATIONS

Chow, et al., :"White-box cryptography and an AES implementation," Selected Areas in Cryptography—SAC 2002 (Kaisa Nyberg and Howard M. Heys, eds.) Lecture Notes in Computer Science, vol. 2595, Springer, 2003, pp. 250-270.

Chow, et al., "A White-Box DES Implementation for DRM Applications," Digital Rights Management: ACM CCS-9 Workshop, DRM 2002, Washington, D.C., USA, Nov. 18, 2002, 1-16.

* cited by examiner

FIG. 1

WHITE-BOX IMPLEMENTATION

FUNCTIONS $f_i$, $g_i$, FIXED

WATERMARKING INPUT AND OUTPUT OF A WHITE-BOX IMPLEMENTATION

TECHNICAL FIELD

Various exemplary embodiments disclosed herein relate generally to watermarking the input and the output of a white-box implementation of a cryptographic function.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Cryptographic algorithms are typically designed with the black attack model in mind. This means that the attacker is assumed to have only access to the input/output behavior of the algorithm. In practice, however, an attacker typically has access to more information. The attacker may, for instance, have access to side-channel information on the execution of the algorithm. In this case, the attack model is referred to as being grey-box. In the most extreme case, called the white-box attack model, an attacker may even have full access to and full control over the execution environment running the algorithm.

In the white-box attack model, secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

Content providers must deliver content to legitimate users across a hostile network to a community where not all users or devices can be trusted. In some cases the user devices may have a hardware cryptographic solution to assist in the distribution of content. Even though this hardware solution may only allow observation of the input and output, it may also be possible as described above for an attacker to gain access to side channel information that allows the attacker to defeat the cryptographic function.

The situation where a hardware cryptographic solution is not possible has led to the development of white-box cryptography. In the white-box cryptography scenario it is assumed that the user has complete control of the hardware and software that provides access to the content, and an unlimited amount of time and resources to attack and bypass any content protection mechanisms. The secure software code that enforces the terms and conditions under which the content may be used should be tamper resistant. Digital rights management is a common application of secure software applications. The general approach in digital rights management for protected content distributed to user devices is to encrypt the digital content using for example, DES (Data Encryption Standard), AES (Advanced Encryption Standard), or using other known encryption schemes, and to use decryption keys to recover the digital content. These decryption keys must be protected to prevent unauthorized access to protected material.

In the digital right management scenario, the attacker has complete control of the software enforcing the management and access to the protected content. Accordingly, the attacker can modify software and also seek to obtain cryptographic keys used to encrypt the protected content. Such keys may be found by analyzing the software

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a non-transitory machine-readable storage medium encoded with instructions for mapping an input message to an output message by a keyed cryptographic encryption operation, wherein the keyed cryptographic encryption operation includes a first round, including: instructions for performing a substitution function on a first portion of the input message to produce an output, wherein the substitution function incorporates a portion of a cryptographic key; and instructions for performing a watermarking function on the output, wherein the watermarking function produces a watermark output when the first input portion has a specific predetermined value, wherein the watermark output uniquely identifies the keyed cryptographic encryption operation.

Further various embodiments relate to a method of mapping an input message to an output message by a keyed cryptographic encryption operation, wherein the keyed cryptographic encryption operation includes a first round, including: performing a substitution function on a first portion of the input message to produce an output, wherein the substitution function incorporates a portion of a cryptographic key; and performing a watermarking function on the output, wherein the watermarking function produces a watermark output when the first input portion has a specific predetermined value, wherein the watermark output uniquely identifies the keyed cryptographic encryption operation.

Various embodiments are described, wherein the watermarking function produces a weighted output when the first input portion has a value other than the specific predetermined value.

Various embodiments are described, wherein: the cryptographic encryption operation is an advanced encryption standard (AES) operation; and the watermarking function implements a portion of an AES MixColumns operation.

Various embodiments are described, wherein producing the watermark output is further based upon a watermark condition, wherein the watermark condition is based upon a second portion of the input message.

Various embodiments are described, wherein the first portion of the input is a first ASCII value and wherein watermark value is a different second ASCII value that has an appearance similar to the first ASCII value.

Various embodiments are described, wherein the keyed cryptographic encryption operation includes a plurality of lookup tables.

Various embodiments are described, wherein the keyed cryptographic encryption operation includes a plurality of finite state machines.

Further various embodiments relate to a non-transitory machine-readable storage medium encoded with instructions for mapping an input message to an output message by a keyed cryptographic decryption operation, wherein the keyed cryptographic decryption operation includes a last round and a state, including: instructions for performing a watermarking function on a first portion of the state prior to input to the last round, wherein the watermarking function produces a first output when the first portion has a specific predetermined value; instructions for performing a substitution function in the last round on the first output to produce a watermark output, wherein the substitution function incorporates a portion of a cryptographic key, wherein the watermark output uniquely identifies the keyed cryptographic encryption operation.

Further various embodiments relate to a method of mapping an input message to an output message by a keyed cryptographic decryption operation, wherein the keyed cryptographic decryption operation includes a last round and a state, including: performing a watermarking function on a first portion of the state prior to input to the last round, wherein the watermarking function produces a first output when the first portion has a specific predetermined value; performing a substitution function in the last round on the first output to produce a watermark output, wherein the substitution function incorporates a portion of a cryptographic key, wherein the watermark output uniquely identifies the keyed cryptographic encryption operation.

Various embodiments are described, wherein the watermarking function produces an output equal to the first input portion when the first input portion has a value other than the specific predetermined value.

Various embodiments are described, wherein producing the watermark output is further based upon a watermark condition, wherein the watermark condition is based upon a second portion of the state.

Various embodiments are described, wherein, wherein the cryptographic decryption operation is an advanced encryption standard (AES) operation.

Various embodiments are described, wherein when the first portion of the state is input to the substitution function a first ASCII value results and wherein watermark value is a different second ASCII value that has an appearance similar to the first ASCII value.

Various embodiments are described, wherein the keyed cryptographic decryption operation includes a plurality of lookup tables.

Various embodiments are described, wherein the keyed cryptographic decryption operation includes a plurality of finite state machines.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

As described above, white-box cryptography is about implementing a cryptographic algorithm in software, such that it is hard for an attacker to extract the key. Even if the designer of the white-box implementation did this perfectly, an attacker may not publish the key, but rather the decrypted content itself. A known approach to overcome this issue is to watermark the content, such that the content provider may find the source of a leakage. Embodiments are described herein that include a method for watermarking content in a stealthy way. That is, instead of explicitly putting a watermark on the output of a white-box implementation, the method integrates the algorithm for putting a watermark on the content in the implementation of the decryption algorithm. Although this does not directly prevent illegal distribution, it helps indirectly because it enables the content provider to trace an illegitimate copy back to the traitor. Knowing the traitor, the content provider can next take adequate action, such as refusing them further content.

U.S. Pat. No. 8,726,029 to Katzenbeisser et al. (Katzenbeisser) describes a way to add a watermark to the output of a white-box implementation. In brief, the method of Katzenbeisser implements a watermarking algorithm as a network of lookup tables and glues it to the end of the white-box implementation. The embodiments described herein use an alternative technique. This alternative technique identifies a set W of plaintext blocks. Next, a white-box implementation is constructed that behaves normally for all blocks not in W. For the blocks of W changes are made to the plaintext block. These changes are different for the different instantiations of the white-box implementation. In order to be effective as a watermark, the set W and the type of changes may be chosen such that the changes are hardly perceivable.

Further, instead of putting a watermark on the output of a decryption algorithm to enable traitor tracing, the alternate technique may also be used to put a watermark on the input of an encryption algorithm. This gives an approach for signing messages because the watermark that is put on the input is linked to the white-box implementation that generated it.

U.S. patent application Ser. No. 14/263,372 entitled "Behavioral Fingerprint in a White-box Implementation" to Michiels et al. ("Michiels") describes embodiments where, inter alia, a white-box implementation is modified such that for a small set V of inputs, the white-box implementation gives an incorrect answer. Furthermore, these incorrect answers are different for different users. As a result, the incorrect answers may be used as a fingerprint of the white-box implementation: if a user illegally distributes his/her white-box implementation, then the illegally distributed white-box implantation can be provide with inputs from V to discover the source of the leakage.

Instead of putting a fingerprint on a white-box implementation, the embodiments described herein apply a watermark on the input or output of a white-box implementation. For a decryption algorithm this means that while Michiels describes a method for tracing a traitor that illegally distributes a white-box implementation, the method of the embodiments described herein is meant for tracing a traitor that illegally distributes the outcome of a white-box implementation, e.g., content.

To see the difference with the Michiels, two essential features of Michiels are recapped:

Michiels identifies a small set V of k fingerprint messages for which the white-box implementation gives an incorrect answer. The set V and the value k may be chosen such that the probability that the message is encountered in normal execution is negligible. For instance, V may be chosen as the singleton set with one randomly chosen message; and The outcome of the white-box implementation for the messages from V may be arbitrary, i.e., it is not restricted by some conditions that it has to satisfy.

The current embodiments described herein, on the other hand, include the following features:

A small set W of l watermark plaintext messages is identified for which the white-box implementation gives a different answer. The set W and the value l are chosen such that if some content needs to be watermarked, with probability almost 1 it has at least one message from the set W; and The changes that the white-box implementation makes to messages from W is such that the changes are hardly perceivable.

This may be realized as follows. White-box implementations (e.g., table-based ones) are obfuscated implementations of a cryptographic algorithm A. Into such an implementation, the computation of a predicate $P(m) \in \{0, 1, \ldots, l\}$ is merged in an obfuscated way. The predicate is such that $P(m)=0$ if m is not one of the l messages from W and $P(m)=j$ if m is the jth message from W. When $P(m)>0$, the implementation of A includes an intervention (e.g., by changing an intermediate value), such that it may provide an answer that is different but hardly perceivably. When $P(m)=0$, the implementation of A does not provide an incorrect answer. As the total implementation is heavily obfuscated, the watermark-part is hard to detect and remove.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented. While the description of embodiments below are directed to software implementation running on a processor, it is noted that these embodiments may also be partially or completely implemented in hardware as well. The lookup tables and finite state machines that are described may be implemented in hardware to carry out the various functions described.

A table-based approach to a white-box implementation of the Advanced Encryption Standard (AES) and the Data Encryption Standard (DES) were proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, D R M 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

As noted, for many cryptographic operations it is desired to have a white-box implementation. The invention may be applied, for example, to symmetric and asymmetric cryptographic operations. Also, the invention may be applied to block ciphers, stream ciphers, message authentication schemes, signature schemes, etc. Note that the invention may also be applied to hash functions. The latter is especially useful if the hash function is used as a building block which processes secret information, e.g., a secret key, secret data, etc. For example, the invention may be applied to a hash function used in a keyed-Hash Message Authentication Code (HMAC or KHMAC). Well known block ciphers include: Advanced Encryption Standard (AES), Secure And Fast Encryption Routine, (SAFER, and variants SAFER+ and SAFER++), Blowfish, Data Encryption Standard (DES), etc. A well-known stream cipher is RC4. Moreover any block cipher can be used as stream cipher using an appropriate mode of operation, e.g., Cipher feedback (CFB), Counter mode (CTR), etc.

The input message can represent, e.g., encrypted content data, such as multi-media data, including audio and/or video data. The encrypted content data may also include encrypted software, e.g., encrypted computer code representing some computer application, e.g., a computer game, or an office application. The input message may also represent a key for use in a further cryptographic operation. The latter may be used, for example, in a key exchange protocol, wherein a white-box implementation according to the invention encrypts and/or decrypts data representing a new key. The input data may also be plain data, for example, plain user data. The latter is especially advantageous in message authentication schemes. A white-box implementation according to the invention may have the property that the implementation may only be used for encryption, only be used for decryption, but not for both. For example, this property can be achieved if the implementation uses look-up tables which are not bijective, for example, a look-up table having more input bits than output bits. Accordingly, if a user only has a white-box decryptor, he may verify a MAC code but not create new MACs. This strengthens the non-repudiation properties of such a message authentication scheme.

The white-box implementation may be implemented using a plurality of basic blocks. The plurality of basic blocks is interconnected, in the sense that some of the blocks build on the outputs of one or more of the previous blocks. A basic block may be implemented in hardware, for example, as a computer chip. A basic block may use a switch board, a state machine or any other suitable construction for implementing functions in computer hardware. A basic block may also be implemented in software running on a general purpose computer chip, e.g. a microprocessor. For example, a basic block may use a plurality of computer instructions, including arithmetical instructions, which together implement the functionality of the basic block. A widely used implementation for the basic block, which may be used both in software and hardware, is a look-up table. For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number. Further, finite state machines or code obfuscation may be used to implement the white-box implementation.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number input bits and produces the same number of output bits. The input encoding and output encoding used in such obfuscation are not explicit in the final white-box implementation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. Various ways are known to hide a key in a cryptographic system. Typically, at least the method of partial evaluation is used, wherein a basic block which needs key input is evaluated in-so-far that it does not depend on the input-message. For example, a basic operation wherein an input-value, a masking value, which does not depend on the input-message, e.g. a value from a substitution box (S-box), and a key-value need to be XORed can be partially evaluated by XORing the key value and the masking value together beforehand. In this way the operation still depends on the key-value although the key-value is not explicitly present in the implementation. Instead, only the XOR between the key-value and masking-value is present in the implementation. Note that, more complicated ways and/or further ways of hiding the keys are compatible with embodiments of this invention.

Below white-box embodiments are described using the AES (Advanced Encryption Standard) block cipher, because AES has become a widely used standard for block ciphers. AES is a block cipher with a block size of 128 bits or 16 bytes. The plaintext is divided in blocks of 16 bytes which form the initial state of the encryption algorithm, and the final state of the encryption algorithm is the cipher text. At any given point in the encryption algorithm these 16 bytes are the state of the encryption algorithm. To conceptually explain AES, the bytes of the state are organized as a matrix of 4×4 bytes. AES includes a number of rounds, which depend on the key size. Each round includes similar processing steps operating on bytes, rows, or columns of the state matrix, each round using a different round key in these processing steps. In the discussion using AES as an example, it is noted that AES defines a round in a specific manner. In the embodiments below, a round is any grouping of steps that includes at least one non-linear mapping function, such as an S-box in AES. Accordingly, a round as described below includes one non-linear mapping function and any combination of other steps of the cryptographic function. Further, the boundary of the round may start with the non-linear mapping function, for example an S-box, or any other operation that may be merged with the non-linear mapping function, for example a key addition.

Figure 1:
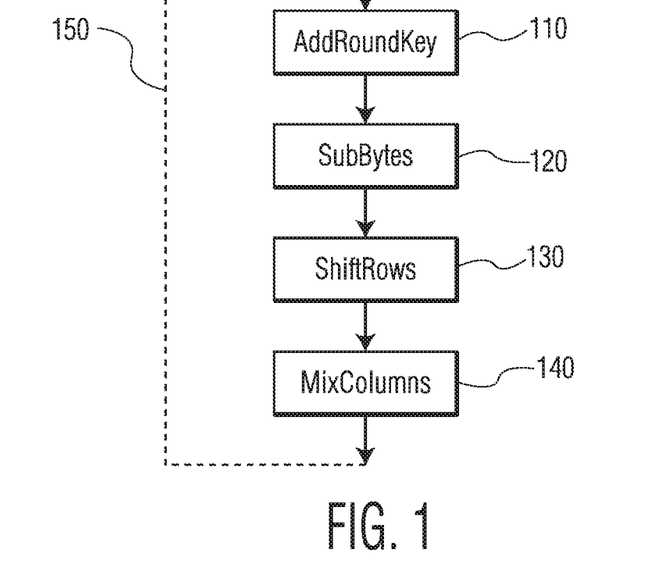
FIG. 1 illustrates the main steps of a round of AES.

FIG. 1 illustrates some main processing steps of a round of AES. The processing steps include:
AddRoundKey 110—each byte of the state is XORed with a byte of the round key;

SubBytes 120—a byte-to-byte permutation using a lookup table;

ShiftRows 140—each row of the state is rotated a fixed number of bytes; and

MixColumns 150—each column is processed using a modulo multiplication in $GF(2^8)$.

The steps SubBytes 120, ShiftRows 130, and MixColumns 150 are independent of the particular key used. The key is applied in the step AddRoundKey 110. Except for the step ShiftRows 140, the processing steps can be performed on each column of the 4×4 state matrix without knowledge of the other columns. Therefore, they can be regarded as 32-bit operations as each column consists of four 8-bit values. Dashed line 150 indicates that the process is repeated until the required number of rounds has been performed.

Each of these steps or a combination of steps may be represented by a lookup table or by a network of lookup tables. If the AddRoundKey 110 step is implemented by XORing with the round key, then the key is visible to the attacker in the white-box attack context. The AddRoundKey 110 step can also be embedded in lookup tables, which makes it less obvious to find out the key. In fact, it is possible to replace a full round of AES by a network of lookup tables. For example, the SubBytes 120, ShiftRows 130, and MixColumns 150 steps may be implemented using table lookups. Below a possible white-box implementation of AES in sufficient detail is discussed to describe the embodiments of the invention below, but further detailed descriptions of such an implementation are found in Chow 1. Also, other variations in the lookup table implementation may be used which are within the scope of the invention.

Figure 2:
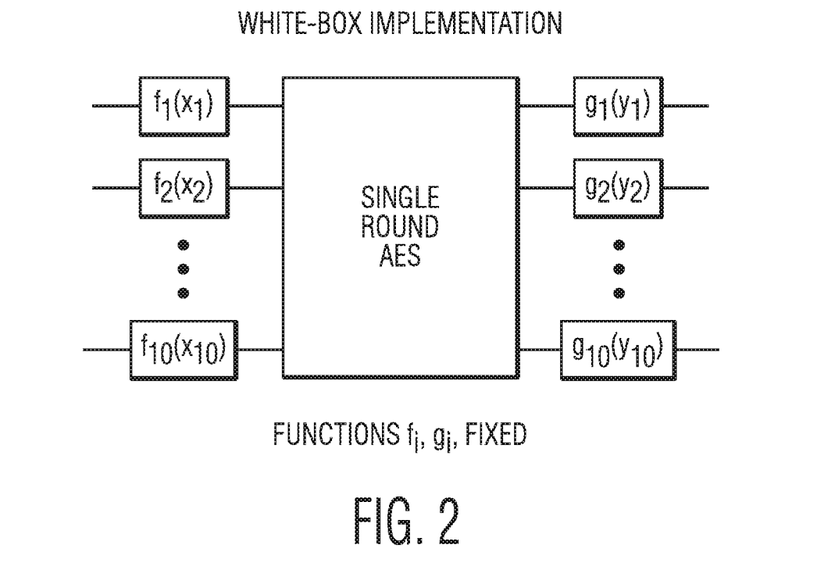
FIG. 2 illustrates a white-box AES implementation with fixed encodings on the input of the rounds.

Both the table-based white-box implementations and the finite state machine implementations have the property that all intermediate values in the implementation are encoded (as compared to a standard implementation). Examples of white-box implementations using finite state machines are disclosed in U.S. Patent Publication 2007/0014394 entitled "Data Processing Method" and a presentation at the Re-trust Sixth Quarterly Meeting entitled "Synchrosoft MCFACT™ Secure Data Processing Technology" by Wulf Harder and Atis Straujums dated Mar. 11, 2008, which each are hereby incorporated by reference for all purposes as if fully set forth herein. FIG. 2 illustrates a white-box AES implementation with fixed encodings on the input of the rounds, i.e., on the input of the S-boxes. As shown, each of the 16 input bytes are encoded by $f_i$ and each of the output bytes are encoded by $g_i$.

In order to describe embodiments of the invention, a basic description of a table-based white-box AES implementation will be described. For a more detailed description of a method for implementing a table-based white-box AES see Chow 1. Chow 1 illustrates a specific implementation that breaks up certain functions using tables of specified sizes. It is well understood that various other divisions of the tables may be made resulting in different functions for the look-up tables and different sizes. Further, while the embodiments of the invention described below use a table-based white-box implementation of AES, other ciphers and cryptographic functions may be implemented according to the embodiments described. Also, other types of white-box implementations may be used instead of the table-base implementation, for example, a finite-state implementation.

The description of the table-based white-box AES is split into two steps. In the first step, a round of AES is described as a network of lookup tables. In the second step, the tables are obfuscated by encoding their input and output.

Step 1: Implementing AES as a Network of Lookup Tables.

AES operates on data blocks of 16 bytes. These are typically described as a 4×4 byte matrix, called the state including bytes $x_{1,1}, x_{1,2}, x_{1,3}, \ldots x_{4,4}$. A round of AES as described above with respect to FIG. 1 include the following operations: AddRoundKey 110, SubBytes 120, ShiftRows 130, and MixColumns 140. The first two operations, AddRoundKey and SubBytes can be merged into a single T-box operation. That is, we can define a byte-to-byte function $T_{i,j}$ for input byte $x_{i,j}$ as $T_{i,j}(x_{i,j})=S(x_{i,j}\oplus k_{i,j})$ where $k_{i,j}$ is a single byte of a 16 byte round key based upon the AES key. Let $y_{i,j}$ be the output of $T_{i,j}$. The ShiftRows operations is just an index-renumbering of the output bytes $y_{i,j}$. For ease of presentation, this operation is omitted in this description, but may be incorporated into the look-up table implementing $T_{i,j}$ or implemented as a separate manipulation of the state matrix. In the MixColumns step, an output byte z of the round is computed from the 4 output bytes $y_{1,j}, y_{2,j}, y_{3,j},$ and $y_{4,j}$ via the algebraic expression $z_{l,j}=MC_{l,1}\cdot y_{1,j}\oplus MC_{l,2}\cdot y_{2,j}\oplus MC_{l,3}\cdot y_{3,j}\oplus MC_{l,4}\cdot y_{4,j}$ in $GF(2^8)$ for some constants $MC_{l,r}$.

Now define a lookup table for each byte-to-byte function $Q_{i,j,l}(x_{i,j})=MC_{l,i}\cdot T_{i,j}(x_{i,j})$ with i, j, l=1, 2, . . . , 16. Then any output byte $z_{l,j}$ may be computed by XORing the results of these lookup tables, i.e., $z_{l,j}=Q_{1,j,l}(x_{1,j})\oplus Q_{2,j,l}(x_{2,j})\oplus Q_{3,j,l}(x_{3,j})\oplus Q_{4,j,l}(x_{4,j})$. Note that the index i, j, l of Q-box can be interpreted as "the contribution of input byte i, j of a round to output byte l, j of the round". The XOR may be implemented to operate on each of two nibbles (i.e., 4-bit values) as a lookup table to reduce the size of the XOR tables. Accordingly, the Q-box may be implemented to produce output nibbles so that the size of the tables is reduced. Therefore, the computation of each output byte $z_{l,j}$ of an AES-round has been described as a network of lookup tables. The network of lookup tables to compute a single output nibble of byte $z_{2,3}$ is shown in FIG. 3.

Figure 3:
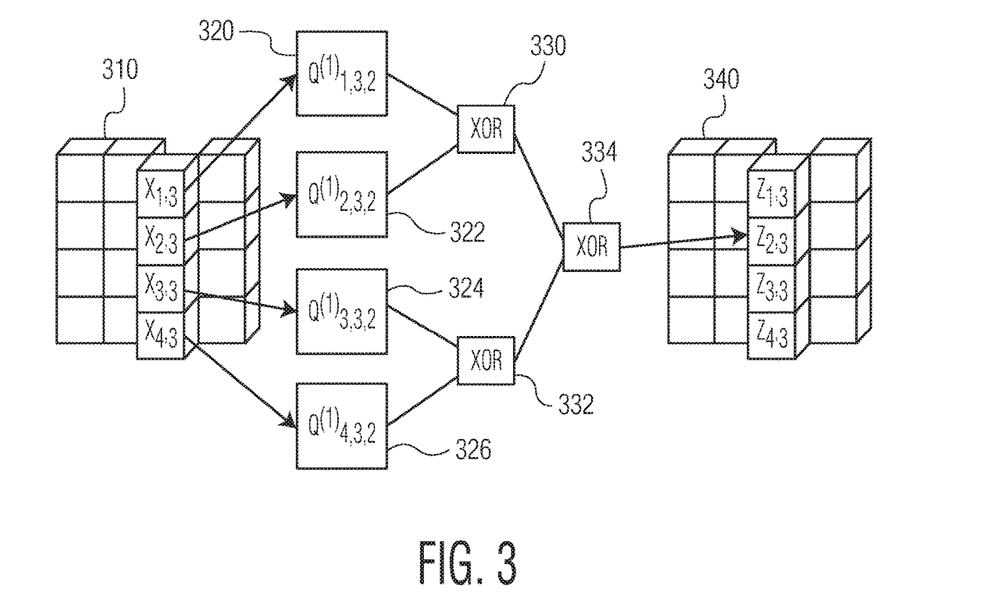
FIG. 3 illustrates the computation of one output nibble by means of a network of look-up tables.

FIG. 3 illustrates the computation of one output nibble by means of a network of look-up tables. The superscript index (1) in the Q-boxes indicates that the tables only provide the first nibble of the output of the Q-box. A set of input bytes $x_{1,3}, x_{2,3}, x_{3,3},$ and $x_{4,3}$ in the input state 310 are input into the Q-boxes 320, 322, 324, 326. The outputs $u_1, u_2$ of lookup tables 320 and 322 are fed into the XOR 330, and the outputs $u_3, u_5$ of lookup table 324 and XOR 330 are fed into the XOR 332. The outputs $u_4, u_6$ of table 326 and XOR 332 are fed into XOR 334. The output of XOR 334 is the first nibble of the output $z_{2,3}$ of output state 340. The second nibble of the output $z_{2,3}$ of output state 340 may be calculated in the same way using additional Q-boxes along with a similar XOR network. Further, additional sets of tables may be implemented to completely convert the input state 310 into the output state 340 by receiving a column of bytes from the input state and converting them into the output of the corresponding column of the output state.

Step 2: Obfuscating the Tables and the Intermediate Values

Figure 4:
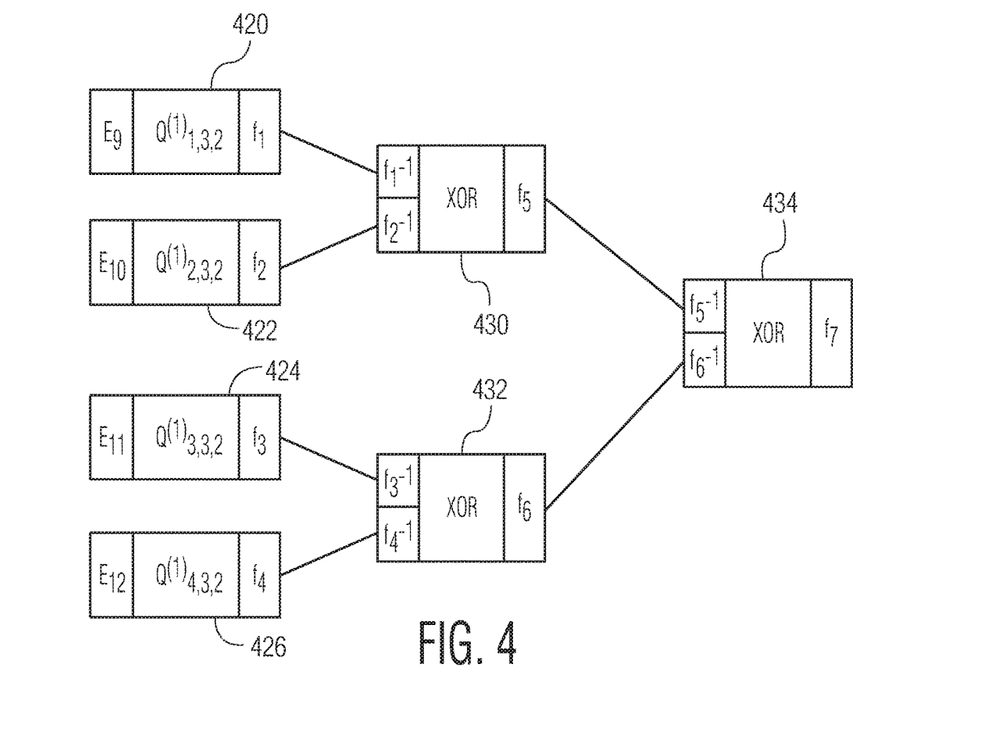
FIG. 4 illustrates a portion of the network table of FIG. 3 obfuscated by encoding the inputs and outputs.

In the implementation depicted in FIG. 3, the key may easily be extracted from the Q-boxes. Just applying the inverse MixColumns multiplication and the inverse S-box to the output reveals the plain AddRoundKey operation. To prevent this, the input and outputs of all lookup tables are encoded with arbitrary bijective functions. This is described in Chow 1. This means that a lookup table is merged with an encoding function that encodes the output and with a decoding function that decodes the input. The encodings are chosen such that the output encoding of one table matches the input encoding assumed in the next tables. A portion of the implementation of FIG. 3 is depicted in FIG. 4 for the first round. In this example, the input to the round is not encoded in order to be compliant with AES, but the output of the round is encoded. The output encoding is handled in the next round. That is, unlike the first round, the second round (and the later rounds) assumes that the input is encoded. Alternatively, the first round may receive an encoded input. This input encoding must then be applied elsewhere in the software program containing the white-box implementation. Similarly, the last round may or may not include an output encoding depending on whether the output is to be AES compliant. Note that in the white-box implementation obtained, both the lookup tables and the intermediate values are obfuscated.

FIG. 4 illustrates a portion of the network of tables of FIG. 3 obfuscated by encoding the inputs and outputs. The lookup tables 420, 422, 424, 426 correspond to lookup tables 320, 322, 324, 326 of FIG. 3. The inputs of lookup tables 420, 422, 424, 426 are encoded by functions $E_9$, $B_{10}$, $B_{11}$, $B_{12}$, respectively. The outputs of lookup tables 420, 422, 424, 426 are encoded by functions $f_1$, $f_2$, $f_3$, $f_4$ respectively. XOR 430 corresponds to XOR 330. The inputs of XOR 430 decode input using $f_1^{-1}$ and $f_2^{-1}$. The output of XOR 430 is then encoded by function $f_5$. In a similar manner XORs 432, 434 have input decodings and output encodings as illustrated. The output $z_{23}$ is encoded using $f_7$.

An embodiment of a white-box implementation that decrypts e-mails will now be described. As a first aspect of the embodiment, an approach for adding a watermark to the e-mail is needed such that this watermark is not distractingly present in the outcome. A possible approach is to change occurrences of the letter "l" (ell) by the number "1" (one). For readability in the following description, the number "1" will be italicized and the letter "l" will be in a normal font. Storing the e-mails as ASCII means that that all characters in the e-mail are stored as bytes. Hence, if 128-bit AES is used to encrypt the e-mails, each data block includes 16 characters. For this embodiment, a watermark w may be defined as a set of byte positions in a data block except for the first and last one, i.e., w⊆{2, 3, . . . , 15}. Such a watermark describes the positions at which all occurrences of the letter "l" are replaced by the number "1". Furthermore, to make the watermark stealthier and less distracting, the replacement is not performed when there are 2 successive appearances of the letter "l". As an example, suppose that data block containing the letters from "hello world" at the first 11 positions are decrypted. Then the watermark w={10} replaces this phrase by "hello wor1d", while the watermarks w={3} and w={4} do not change the phrase because the "l" at the third position is succeeded by an "l" at the fourth position. Because the number of subsets of {2, 3, . . . , 15} is given by $2^{14}$, this approach yields $2^{14}$ different watermarks and thus the possibility to distinguish the content from up to $2^{14}$ different users.

In ASCII, the letter "l" and the number "1" are given by 0x6C and 0x31, respectively. Hence, if i∈w, then watermark w requires that the white-box implementation is modified such that if the ith output byte of the white-box implementation equals 0x6C, then it needs to be changed to 0x31. If, however, byte i−1 or i+1 is also given by 0x6C, then this should not happen. The presence of the "ll" situation may be called a watermark condition that will be used to determine whether to apply the watermark. Other watermark conditions may be defined as well.

An embodiment for w={7} (i.e., changing the $7^{th}$ byte from a "l" to "1") will now be described. If the 4×4-byte output state of AES is interpreted as a 128-bit string by sequencing its 4 rows, then byte number 7 is located at position (2,3) in the output state. Hence, the goal is to extend the white-box implementation discussed above with the functionality that if the output byte (2,3) has the value "l" and the preceding byte (2,2) and succeeding byte (2,4) do not have the value "l", then the value "l" of byte (2,3) is changed to the number "1". This means that the table-network of FIG. 3 will be extended to include this functionality. The obfuscation of the network can next be done in the same way as proposed for FIG. 4.

So, consider the lookup table implementation derived in FIG. 3. As discussed, Round 10 only includes applying a lookup $T_{i,j}^{(r)}$ to each output byte $z_{i,j}$ of Round 9. Hence, output byte (i,j) equals 0x6C, which encodes "l", if and only if $z_{i,j}=(T_{i,j}^{(10)})^{-1}(6C)$. As a result, the (01$^1$ desired functionality is added to the table network if after round 9, but before round 10, the table network depicted in FIG. 5 is inserted.

Figure 5:
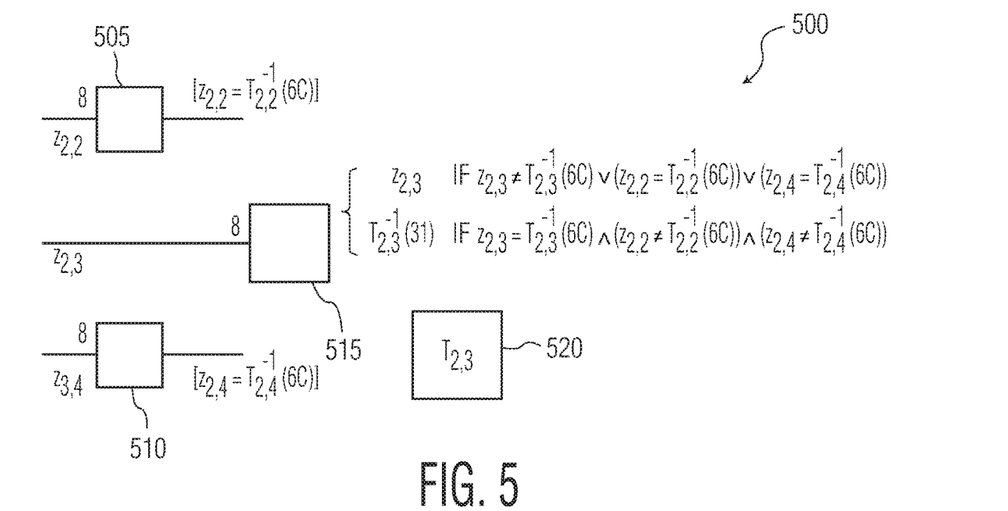
FIG. 5 illustrates a table network that applies a watermark to the output of the decryption operation for a specific byte of the state.

FIG. 5 illustrates a table network that applies a watermark to the output of the decryption operation for a specific byte of the state. The table network 500 receives as inputs $z_{2,2}$, $z_{2,3}$, and $z_{2,4}$. A table 505 determines if a previous byte equals "l", i.e., it determines if $z_{2,2}=T_{2,2}^{-1}$ (6C) and outputs a Boolean value accordingly. Likewise, a table 510 determines if a next byte equals "l", i.e., it determines if $z_{2,4}=T_{2,2}^{-1}$ (6C) and outputs a Boolean value accordingly. The Boolean outputs of tables 505 and 510 indicate watermark conditions. A table 515 receives the Boolean values from tables 505 and 510 and the value $z_{2,3}$. The table 515 outputs $z_{2,3}$ if it will not lead to an output value of "l" or if either the previous byte or the next byte will lead to an output of "l". The output of table 515 will output $T_{2,3}^{-1}(31)$ when the input will lead to an output value of "l" and when neither the previous byte nor the next byte will not lead to an output of "l". This may indicated more formally as:

$$\begin{cases} z_{2,3} & \text{if } (z_{2,3} \neq T_{2,3}^{-1}(6C)) \vee (z_{2,2} = T_{2,2}^{-1}(6C)) \vee (z_{2,4} = T_{2,4}^{-1}(6C)) \\ T_{2,3}^{-1}(31) & \text{if } (z_{2,3} = T_{2,3}^{-1}(6C)) \wedge (z_{2,2} \neq T_{2,2}^{-1}(6C)) \wedge (z_{2,4} \neq T_{2,4}^{-1}(6C)) \end{cases}.$$

The output of table 515 is then input to table 520 which will be part of the next round. The table 520 calculates $T_{2,3}$ based upon its input. This concludes the embodiment for the watermark w={7}.

Above, an embodiment is presented for the case where a watermark is put on the output of a decryption algorithm. A watermark may also be applied to an encryption algorithm. Here, the plaintext is input to the algorithm instead of resulting as the output of the algorithm. Hence, this means that the resulting white-box implementation both puts a watermark on content and encrypts it. If, later on, the message is decrypted, the watermark appears. The watermark can in this case be seen as a kind of signature. If a message contains some watermark, then this watermark may point to the white-box implementation that has encrypted the message.

As for the previous embodiment, this embodiment is described by indicating how to modify the table network of FIG. 3 to add the watermark-functionality. The final white-box implementation may, again, be obtained by adding the encoding functions as has been done in FIG. 4.

Figure 6:
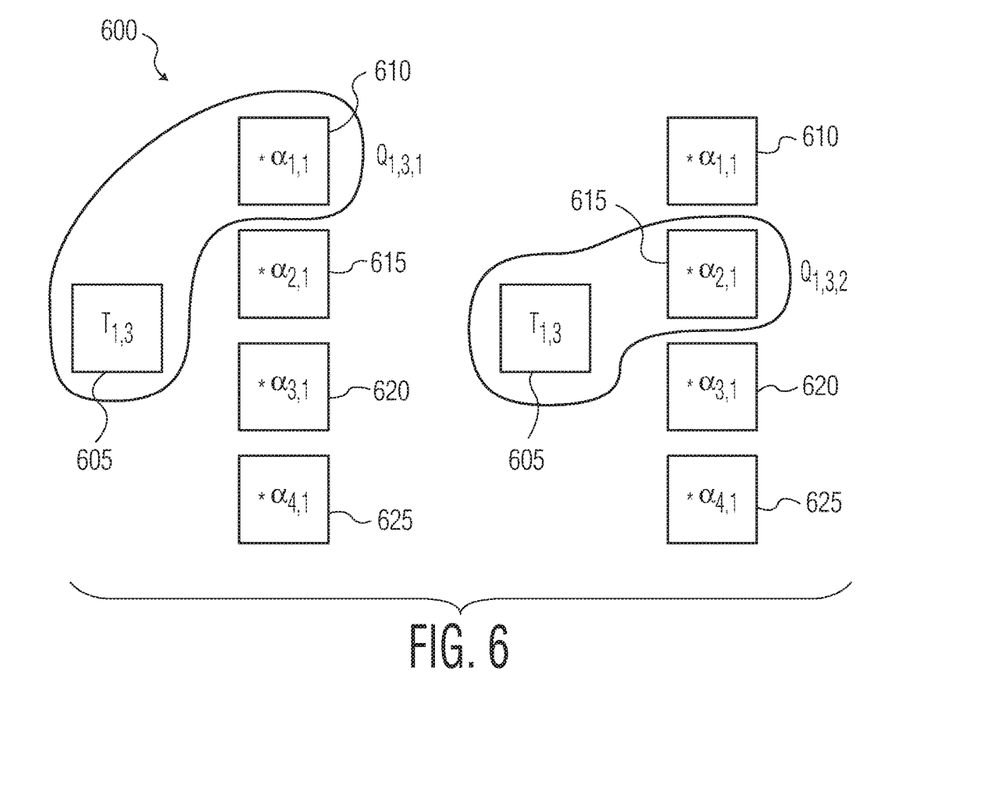
FIG. 6 illustrates a table network with a single T-table being used with four multiply tables.

The Q-tables of FIG. 3 are a merger of the T-functions, as described above, and a multiplication in GF($2^8$), which originates from the MixColumns operation. Instead of merging the T-functions and multiplication, these operation may remain separated. Because a single T-function is merged into 4 Q-tables, one T-table per 4 multiplication tables is needed if the operations are split. FIG. 6 illustrates a table network with a single T-table being used with four multiply tables. The table network 600 includes a T-table 605 that produces an output that is fed into four multiply tables 610, 615, 620, 625. The output from the four multiply tables 610, 615, 620, 625 then are the same at the output from the Q-tables.

Figure 7:
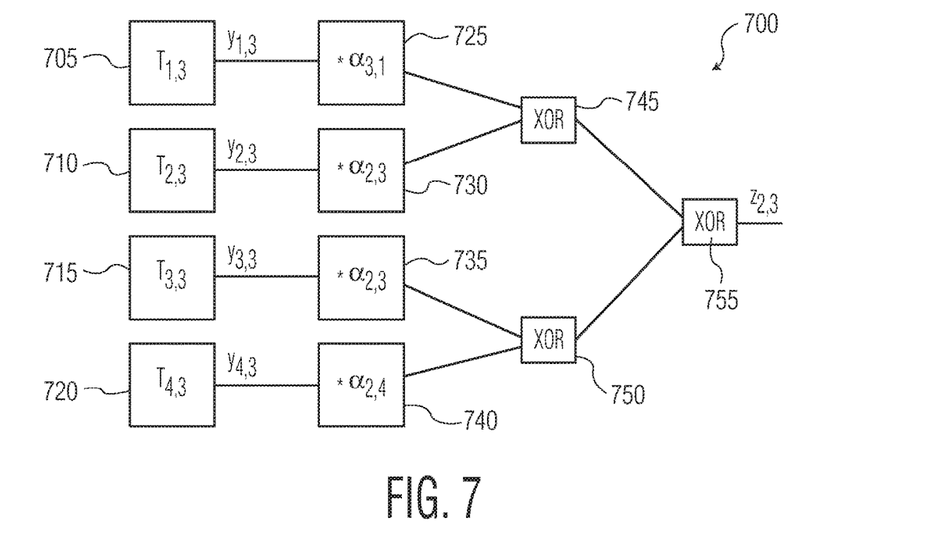
FIG. 7 illustrates a modification of the table network of FIG. 6.

The table network 600 may then be modified to a table network 700 as shown in FIG. 7. FIG. 7 illustrates a modification of the table network of FIG. 6. The table network 700 includes T-tables 705, 710, 715, 720. The outputs $y_{1,3}$, $y_{2,3}$, $y_{3,3}$, $y_{4,3}$ of the T-tables 705, 710, 715, 720 are input to the multiply tables 725, 730, 735, 740, respectively. The outputs of the multiply tables 725, 730, 735, 740 are XORed together by the XOR tables 745, 750, 755 to produce output $z_{2,3}$.

Figure 8:
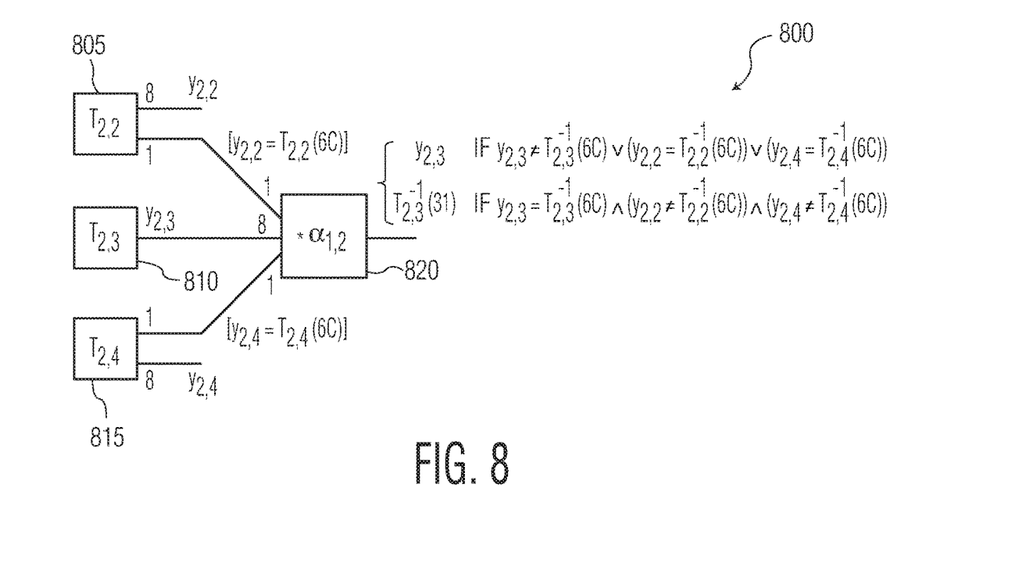
FIG. 8 illustrates a table network that applies a watermark to the input of an encryption operation for a specific byte of the input.

FIG. 8 illustrates a table network that applies a watermark to the input of an encryption operation for a specific byte of the input. An embodiment that adds a watermark w={7} to the input will now be shown. Similar to the decryption embodiment described above, if the input of table $T_{2,3}$ is given by the letter "l" and the preceding and succeeding bytes also do not represent the letter "l", then the white-box implementation should compute the ciphertext corresponding to the input where this "l" is replaced by the number "1". This change in functionality is obtained by replacing the shaded area including T-table 710 and multiply table 730 in FIG. 7 by the network 800 of FIG. 8. The network includes T-tables 805, 810, 815 and a multiplication table 820. In the network 800, the T-tables 805, 815 ($T_{2,2}$ and $T_{2,4}$) are the T-tables illustrated in FIGS. 6 and 7, except for different indices, extended with an additional output bit. The T-table 805 determines if its input (which is the previous byte) equals "l", i.e., it determines if $y_{2,2}=T_{2,2}(6C)$ and outputs a Boolean value accordingly that is the additional output byte. Likewise, T-table 815 determines if it's input (which is the next byte) equals "l", i.e., it determines if $y_{2,4}=T_{2,4}(6C)$ and outputs a Boolean value accordingly that is the additional output byte. The Boolean outputs of tables 805 and 815 indicated watermark conditions. A table 820 receives the Boolean values from tables 805 and 815 and the value $y_{2,3}$ from the T-table 805. The table 820 outputs $y_{2,3}$ if the input value is not "l" or if either the previous input byte or the next input byte is "l". The output of table 820 will output $T_{2,3}(31)$ when the input is "l" and when neither the previous byte nor the next byte is "l". This may indicated more formally as:

$$\begin{cases} y_{2,3} & \text{if } (y_{2,3} \neq T_{2,3}(6C)) \vee (y_{2,2} = T_{2,2}(6C)) \vee (y_{2,4} = T_{2,4}(6C)) \\ T_{2,3}(31) & \text{if } (y_{2,3} = T_{2,3}(6C)) \wedge (y_{2,2} \neq T_{2,2}(6C)) \wedge (y_{2,4} \neq T_{2,4}(6C)) \end{cases}.$$

The output of table 820 is then input to an XOR network as described above. This concludes the encryption embodiment for the watermark w={7}.

It is noted that while specific examples of encryption and decryption embodiments for adding a watermark were described above, various other examples are within the skill of the art. For example, other replacements may be done to indicate the watermark in various positions within the input or output data. Further, substituting for repeated values may or may not be included in the watermark. Also, while the substitution was described in the context of ASCII text, substitutions of other types of data may be accomplished as well.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, a white-box system may include a computer implementing a white-box computer program. Such system, may also include other hardware elements including storage, network interface for transmission of data with external systems as well as among elements of the white-box system.

In an embodiment of the invention, the computer program may include computer program code adapted to perform all the steps of a method according to the invention when the computer program is run on a computer. Preferably, the computer program is embodied on a non-transitory computer readable medium.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

The cryptographic system described herein may be implemented on a user device such as a mobile phone, table, computer, set top box, smart TV, etc. A content provider, such as a television network, video stream service, financial institution, music streaming service, etc., may provide software to the user device for receiving encrypted content from the content provider. That software may have the encryption key embedded therein as described above, and may also include binding strings as described above. Then the content provider may send encrypted content to the user device, which may then decrypt using the supplied software and use the content.

Figure 9:
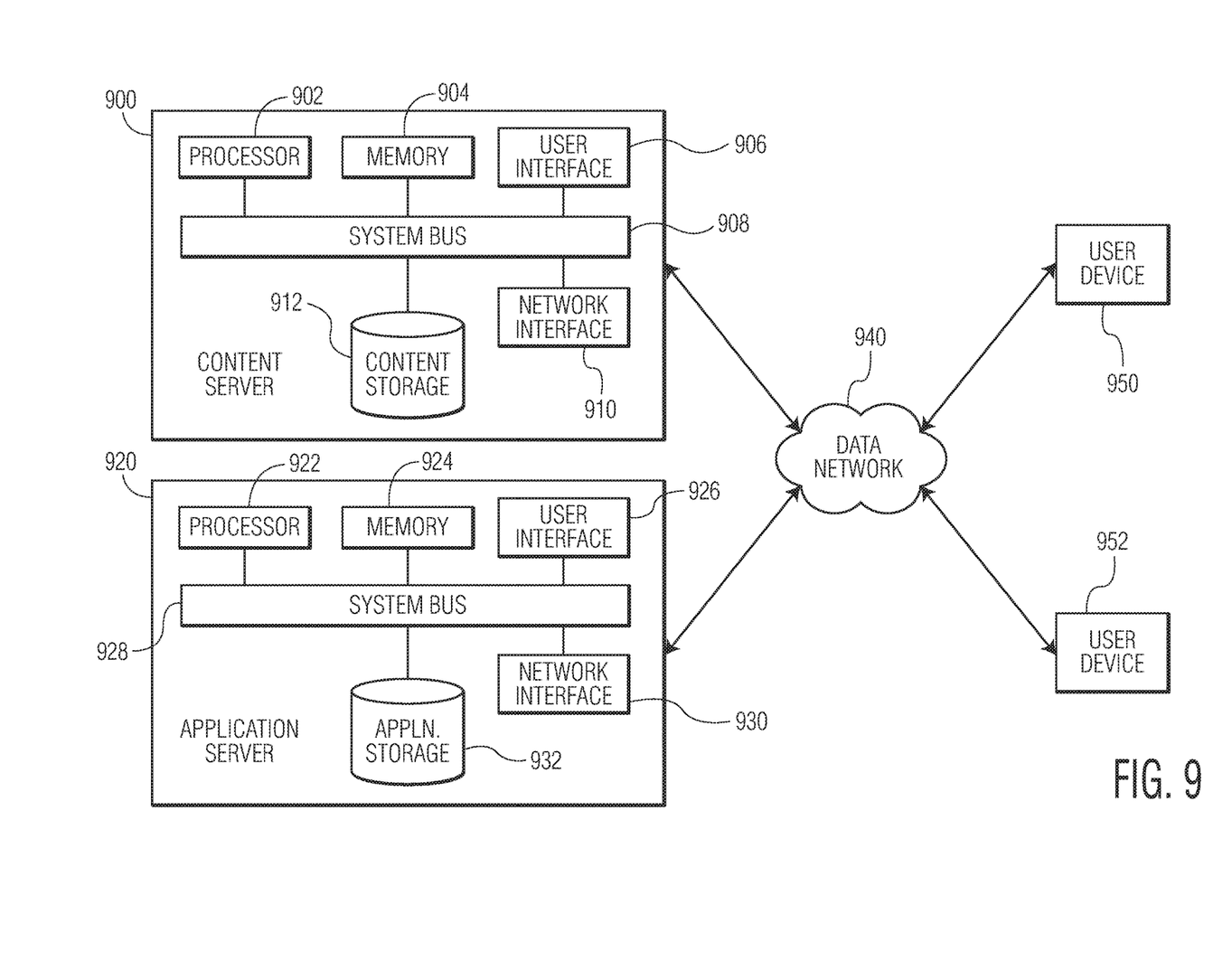
FIG. 9 illustrates a system for providing a user device secure content and a software application that processes the secure content.

FIG. 9 illustrates a system for providing a user device secure content and a software application that processes the secure content. The system includes a content server 900, application server 920, user devices 950, 952, and a data network 940. The user devices 950, 952 may request access to secure content provided by the content server 900 via data network 940. The data network can be any data network providing connectivity between the user devices 950, 952 and the content server 900 and application server 920. The user devices 950, 952 may be one of a plurality of devices, for example, set top boxes, media streamers, digital video recorders, tablets, mobile phones, laptop computers, portable media devices, smart watches, desktop computers, media servers, etc.

The user request for access may first require the downloading of a software application that may be used to process the secure content provided by the content server 900. The software application may be downloaded from the application server 920. The software application may be obscured using the techniques described above as well as operate as described above. Once the user devices 950, 952 install the software application, the user device may then download secure content from the content server 900 and access the secure content using the downloaded software application. For example, the downloaded software application may perform decryption of encrypted content received from the content server. In other embodiments, the software application may perform other secure operations, such as for example, encryption, digital signature generation and verification, etc.

The content server 900 may control the access to the secure content provided to the user devices 950, 952. As a result when the content server 900 receives a request for secure content, the content server 900 may transmit the secure content to the requesting user device. Likewise, the application server 920 may control access to the software application provided to the user devices 950, 952. As a result when the content server 920 receives a request for the software application, the application server 920 may transmit the software application to the requesting user device. A user device requesting the software application or secure content may also be authenticated by the respective servers, before providing the software application or secure content to the user device.

The content server 900 may include a processor 902, memory 904, user interface 906, network interface 910, and content storage 912 interconnected via one or more system buses 908. It will be understood that FIG. 9 constitutes, in some respects, an abstraction and that the actual organization of the components of the device 900 may be more complex than illustrated.

The processor 902 may be any hardware device capable of executing instructions stored in memory 904 or storage 912. As such, the processor may include a microprocessor, field programmable gate array (FPGA), application-specific integrated circuit (ASIC), or other similar devices.

The memory 904 may include various memories such as, for example L1, L2, or L3 cache or system memory. As such, the memory 902 may include static random access memory (SRAM), dynamic RAM (DRAM), flash memory, read only memory (ROM), or other similar memory devices.

The user interface 906 may include one or more devices for enabling communication with a user such as an administrator. For example, the user interface 906 may include a display, a mouse, and a keyboard for receiving user commands.

The network interface 910 may include one or more devices for enabling communication with other hardware devices. For example, the network interface 910 may include a network interface card (NIC) configured to communicate according to the Ethernet protocol. Additionally, the network interface 910 may implement a TCP/IP stack for communication according to the TCP/IP protocols. Various alternative or additional hardware or configurations for the network interface 910 will be apparent.

The content storage 912 may include one or more machine-readable content storage media such as read-only memory (ROM), random-access memory (RAM), magnetic disk storage media, optical storage media, flash-memory devices, or similar storage media. In various embodiments, the content storage 912 may store content to be provided to users.

The application server 920 includes elements like those in the content server 900 and the description of the like elements in the content server 900 apply to the application server 920. Also, the content storage 912 is replaced by application storage 932. Further, it is noted that the content server and applications server may be implemented on a single server. Also, such servers may be implemented on distributed computer systems as well as on cloud computer systems.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable storage medium encoded with instructions for mapping an input message to an output message by a keyed cryptographic encryption operation, wherein the keyed cryptographic encryption operation includes a first round, comprising:
   instructions for performing a substitution function on a first portion of the input message to produce an output, wherein the substitution function incorporates a portion of a cryptographic key; and
   instructions for performing a watermarking function on the output, wherein the watermarking function produces a watermark output when the first input portion has a specific predetermined value,
   wherein the watermark output uniquely identifies the keyed cryptographic encryption operation.

2. The non-transitory machine-readable storage medium of claim 1, wherein the watermarking function produces a weighted output when the first input portion has a value other than the specific predetermined value.

3. The non-transitory machine-readable storage medium of claim 2, wherein:
   the cryptographic encryption operation is an advanced encryption standard (AES) operation; and
   the watermarking function implements a portion of an AES MixColumns operation.

4. The non-transitory machine-readable storage medium of claim 1, wherein producing the watermark output is further based upon a watermark condition, wherein the watermark condition is based upon a second portion of the input message.

5. The non-transitory machine-readable storage medium of claim 1, wherein the first portion of the input is a first ASCII value and wherein the watermark value is a different second ASCII value that replaces the first ASCII value.

6. The non-transitory machine-readable storage medium of claim 1, wherein the keyed cryptographic encryption operation includes a plurality of lookup tables.

7. The non-transitory machine-readable storage medium of claim 1, wherein the keyed cryptographic encryption operation includes a plurality of finite state machines.

8. A method of mapping an input message to an output message by a keyed cryptographic encryption operation, wherein the keyed cryptographic encryption operation includes a first round, comprising:
performing a substitution function on a first portion of the input message to produce an output, wherein the substitution function incorporates a portion of a cryptographic key; and
performing a watermarking function on the output, wherein the watermarking function produces a watermark output when the first input portion has a specific predetermined value,
wherein the watermark output uniquely identifies the keyed cryptographic encryption operation.

9. The method of claim 8, wherein the watermarking function produces a weighted output when the first input portion has a value other than the specific predetermined value.

10. The method of claim 9, wherein:
the cryptographic encryption operation is an advanced encryption standard (AES) operation; and
the watermarking function implements a portion of an AES MixColumns operation.

11. The method of claim 8, wherein producing the watermark output is further based upon a watermark condition, wherein the watermark condition is based upon a second portion of the input message.

12. The method of claim 8, wherein the first portion of the input is a first ASCII value and wherein the watermark value is a different second ASCII value that replaces the first ASCII value.

13. The method of claim 8, wherein the keyed cryptographic encryption operation includes a plurality of lookup tables.

14. The method of claim 8, wherein the keyed cryptographic encryption operation includes a plurality of finite state machines.

15. A non-transitory machine-readable storage medium encoded with instructions for mapping an input message to an output message by a keyed cryptographic decryption operation, wherein the keyed cryptographic decryption operation includes a last round and a state, comprising:
instructions for performing a watermarking function on a first portion of the state prior to input to the last round, wherein the watermarking function produces a first output when the first portion has a specific predetermined value;
instructions for performing a substitution function in the last round on the first output to produce a watermark output, wherein the substitution function incorporates a portion of a cryptographic key,
wherein the watermark output uniquely identifies the keyed cryptographic encryption operation.

16. The non-transitory machine-readable storage medium of claim 15, wherein the watermarking function produces an output equal to the first input portion when the first input portion has a value other than the specific predetermined value.

17. The non-transitory machine-readable storage medium of claim 15, wherein producing the watermark output is further based upon a watermark condition, wherein the watermark condition is based upon a second portion of the state.

18. The non-transitory machine-readable storage medium of claim 15, wherein the cryptographic decryption operation is an advanced encryption standard (AES) operation.

19. The non-transitory machine-readable storage medium of claim 15, wherein when the first portion of the state is input to the substitution function a first ASCII value results and wherein the watermark value is a different second ASCII value that replaces the first ASCII value.

20. The non-transitory machine-readable storage medium of claim 15, wherein the keyed cryptographic decryption operation includes a plurality of lookup tables.

21. The non-transitory machine-readable storage medium of claim 15, wherein the keyed cryptographic decryption operation includes a plurality of finite state machines.

22. A method of mapping an input message to an output message by a keyed cryptographic decryption operation, wherein the keyed cryptographic decryption operation includes a last round and a state, comprising:
performing a watermarking function on a first portion of the state prior to input to the last round, wherein the watermarking function produces a first output when the first portion has a specific predetermined value;
performing a substitution function in the last round on the first output to produce a watermark output, wherein the substitution function incorporates a portion of a cryptographic key,
wherein the watermark output uniquely identifies the keyed cryptographic encryption operation.

23. The method of claim 22, wherein the watermarking function produces an output equal to the first input portion when the first input portion has a value other than the specific predetermined value.

24. The method of claim 22, wherein producing the watermark output is further based upon a watermark condition, wherein the watermark condition is based upon a second portion of the state.

25. The method of claim 22, wherein the cryptographic decryption operation is an advanced encryption standard (AES) operation.

26. The method of claim 22, wherein when the first portion of the state is input to the substitution function a first ASCII value results and wherein the watermark value is a different second ASCII value that replaces the first ASCII value.

27. The method of claim 22, wherein the keyed cryptographic decryption operation includes a plurality of lookup tables.

28. The method of claim 22, wherein the keyed cryptographic decryption operation includes a plurality of finite state machines.

* * * * *